(12) United States Patent
Blanchard, III et al.

(10) Patent No.: US 6,520,466 B1
(45) Date of Patent: Feb. 18, 2003

(54) PERSONAL DIGITAL ASSISTANT (PDA) ATTACHMENT MECHANISM

(75) Inventors: Dana L. Blanchard, III, Longmont, CO (US); Gary A. Fraze, Big Bear City, CA (US); Joseph Anscher, Muttontown, NY (US)

(73) Assignee: Case Logic, Inc., Longmont, CO (US)

( * ) Notice: Subject to any disclaimer, the term of this patent is extended or adjusted under 35 U.S.C. 154(b) by 0 days.

(21) Appl. No.: 09/930,726

(22) Filed: Aug. 15, 2001

(51) Int. Cl.[7] ................................................. A47F 5/00
(52) U.S. Cl. ..................... 248/309.1; 248/300; 379/455
(58) Field of Search .............................. 248/309.1, 300, 248/176.1, 314; 379/455

(56) References Cited

U.S. PATENT DOCUMENTS

| | | | | |
|---|---|---|---|---|
| 4,406,928 A | * | 9/1983 | MacKenzie | 379/454 |
| 4,998,277 A | * | 3/1991 | Rioux, Jr. | 379/454 |
| 5,295,649 A | * | 3/1994 | Lee | 248/309.1 X |
| 5,639,004 A | | 6/1997 | Carlton et al. | 224/579 |
| 5,694,458 A | * | 12/1997 | Hsu | 379/455 X |
| 5,762,250 A | | 6/1998 | Carlton et al. | 224/579 |
| 5,898,975 A | * | 5/1999 | Hancock | 16/114.1 |
| 5,899,421 A | | 5/1999 | Silverman | 248/175 |
| 5,988,572 A | * | 11/1999 | Chivallier et al. | 248/176.1 |
| 5,996,956 A | | 12/1999 | Shawver | 248/309.1 |
| 6,062,518 A | * | 5/2000 | Etue | 248/309.1 X |
| D426,549 S | | 6/2000 | Carlson | D14/433 |
| D427,602 S | | 7/2000 | Yerazunis et al. | D14/433 |
| D431,250 S | | 9/2000 | Richter | D14/447 |
| 6,126,129 A | * | 10/2000 | Herron | 248/309.1 X |
| 6,189,755 B1 | | 2/2001 | Wakefield | 224/542 |

OTHER PUBLICATIONS

Franklin Covey Retail, Catalog & Internet, pp. 6–7, 34–35, back page.
Franklin Covey Catalog, pp. 7,8,9,11,12, 13 and 15.
www.targus.com, web pages, Jul. 27, 2000.
Accessories for Palm™ Connected Organizers Catalog, pp. 5, 7, 9, 11, 13, 17–19, 21 and 23.

* cited by examiner

Primary Examiner—Ramon O. Ramirez
(74) Attorney, Agent, or Firm—Sheridan Ross P.C.

(57) ABSTRACT

An attachment device for use with a personal digital assistant (PDA) is provided which generally comprises a back surface, a base, and at least one securement arm. The securement arm(s) are resiliently deflectable to receive and retain the personal digital assistant under the force created in the deflection of the arms, and which allows the PDA to be selectively removed. The attachment device may include attachment apertures to secure the attachment device to a folio or other type of notebook, or to a surface such as a wall, an automobile visor, or an automobile dashboard. The attachment device may also be incorporated into a folio or similar device to provide protection to the personal digital assistant while allowing full access to, and operation of, the PDA.

24 Claims, 6 Drawing Sheets

PERSONAL DIGITAL ASSISTANT (PDA) ATTACHMENT MECHANISM

FIELD OF THE INVENTION

The present invention relates to carrying cases and, more particularly, to carrying cases and attachment mechanisms adapted for use with a personal digital assistant (PDA).

BACKGROUND OF THE INVENTION

Personal digital assistants, or PDA's, are handheld devices which are capable of performing various functions ofpersonal computers and cellular phones depending upon the model or style of PDA. A PDA may be used for wireless communication, like a cellular phone, to send and receive electronic mail. A PDA may also be used to store and display calendars, addresses and telephone numbers, to-do lists, and other electronic information. Commonly, a PDA will include control buttons or a touch-sensitive screen which may be activated by a separate handheld stylus to activate certain functions. The stylus can be used to input information for the purposes of sending electronic mail or entering data related to the stored and displayed information.

Often a desktop base, or cradle, in which the PDA may be seated is included with, or may be purchased separately from, the PDA. This desktop storage device is often electrically wired to interface the PDA with a personal computer. Other cases have been developed to contain the PDA for protection during travel or storage.

One problem with desktop mounting platforms is the inability or inconvenience of transporting the mounting platform with the PDA. In order to transport the mounting platform, the cable connecting the mounting platform to the personal computer must be disconnected for transportation and reconnected upon return to the desk. Additionally, platforms generally receive the PDA but do not secure the PDA within the platform other than by gravity. Therefore, if the desktop mounting platform were to be used to transport the PDA, possible damage to the PDA might result from the PDA slipping from the mounting platform if the platform varies from an upright position.

Other types of cases which have been developed to hold and transport PDA's merely provide a sack-like container or enclosed notebook or wallet type device. Generally, the PDA must be removed entirely from these cases to be used. Further, these cases do not provide additional space for storing or carrying other devices such as a pad of paper or a pen, while constraining the movement of the PDA. Thus, the user of one of these cases would be required to carry a separate folio or notebook for a pad of paper or pen, or additional item which are inconvenient. Further, some cases require that the PDA be permanently affixed to a carrying case with glues, hook and loop materials and other types of unwanted adhesives.

In view of the foregoing perceived deficiencies, there is a need for an apparatus which may be attached to a PDA to constrain its movement while allowing the PDA to be utilized. Further, it would be advantageous to have a device which may be incorporated into a notebook or other handheld which may be used to selectively secure the PDA within the container as well as other items, such as a pad of paper, while allowing the PDA to be easily removed for use in a cradle or other device.

SUMMARY OF THE INVENTION

In accordance with the present invention, an attachment mechanism for use with a personal digital assistant (PDA) is disclosed. As referred herein, the term PDA relates to all types and styles of personal digital assistants, as well as cell phones, personal radios, global positioning systems (GPS) and other handheld electronic devices. The attachment device of the present invention allows a PDA to be securely stored and transported by a user, yet remain accessible and operational. In other words, the attachment device may receive a PDA such that the PDA is provided with protection during transportation yet allows the user of the PDA to access and operate the PDA without removal of the PDA from the attachment device. Further, the present invention may be designed in such a way to allow the PDA to be selectively removed from a storage case for use with a cradle or other similar device.

In one embodiment of the present invention, the attachment device includes a back surface having an upper end and a lower end. The back surface is generally substantially planar with at least one securement arm extending from the back surface proximate to the upper end and a base extending at least substantially perpendicular from the lower end of the back surface. The securement arms have securement tabs for retaining the PDA at the end of the securement arms opposite the connection to the back surface, and are preferably oriented in an opposing relationship to the back surface. The securement arms are resiliently deflectable to receive the PDA as it is inserted into the attachment mechanism and likewise for removal of the PDA. The resiliency of the securement arms allows the PDA to be held within the attachment mechanism by the biasing force created by the deflection of the securement arms. The base prevents movement of the PDA beyond the lower end of the back surface. Thus, the base allows the PDA to be transported within the attachment mechanism without concern that the PDA will fall or otherwise become disengaged from the attachment mechanism.

In another aspect of the present invention, the attachment mechanism may include at least one mounting aperture positioned in or proximate to the back surface. The mounting aperture may allow the attachment of the attachment mechanism to a storage device such ads as a notebook or other similar device such that the attachment mechanism may be used in conjunction with the folio or other device.

In yet another embodiment, the base of the attachment mechanism may include one or more securement tabs. A single securement tab, narrower than the width of the back surface, the PDA, or both, maybe used. Alternatively, two or more narrow securement tabs may be included which are separated by some distance. By providing one or more of these securement tabs, a communication or battery port along the base of the PDA may be accessible while the PDA remains in the attachment mechanism. In this way, full use of the PDA may be obtained without removing the PDA from the attachment mechanism, thereby potentially eliminating the need for a desk-top cradle. It is also foreseeable that the attachment mechanism may be used in conjunction with a desk-top cradle, i.e., the attachment mechanism may be designed to allow the PDA to be placed within the desk-top cradle without removing the PDA from the attachment mechanism.

In yet another embodiment, a storage device such as a notebook, wallet, purse or other device comprising one of the embodiments of the attachment mechanisms is disclosed. The attachment mechanism may be interconnected to a surface of the storage device by attachment means using a mounting aperture(s) or other attachment means in the back surface of the attachment mechanism. Alternatively, at least a portion of the back surface may be inclosed within a portion, e.g., a fabric covering or sleeve, of the storage device to retain the attachment mechanism in the storage device. The fabric covering or other sheet may be sewn, glued, or otherwise secured around the portion of the back surface. Finally, the attachment mechanism may permanently incorporate and enclosed within a portion of the storage device. In this manner, a storage device such as a portable notebook or folio is provided in combination with the attachment mechanism to transport and protect the PDA while allowing full use of the PDA by opening the notebook.

The storage device with the attachment mechanism secured therein may also include additional features beneficial to a PDA user. A note pad maybe included in a portion of the storage device such that a PDA user attending a meeting may make notes external to the PDA system. Pockets may also be included in the storage device to allow the user to store, for example, business cards or a travel itinerary. The storage device could also include a loop for storing a pen or other writing instrument, or the stylus for use with the PDA to improve accessibility to the stylus.

Based on the foregoing summary, a number of worthwhile aspects of the present invention can readily be identified. A simple device to contain and secure a PDA during transportation and use is provided. The attachment mechanism of the present invention provides protection for the PDA without hampering usage, while allowing the PDA to be selectively removed and placed in a desk-top cradle or other similar device. The simple construction allows the present invention to be incorporated into a notebook or other similar device to provide additional user friendly features in conjunction with the PDA. Additional advantages of the present invention will become readily apparent from the following discussion, particularly when incorporated with the accompanying drawings.

DETAILED DESCRIPTION

Figure 1:
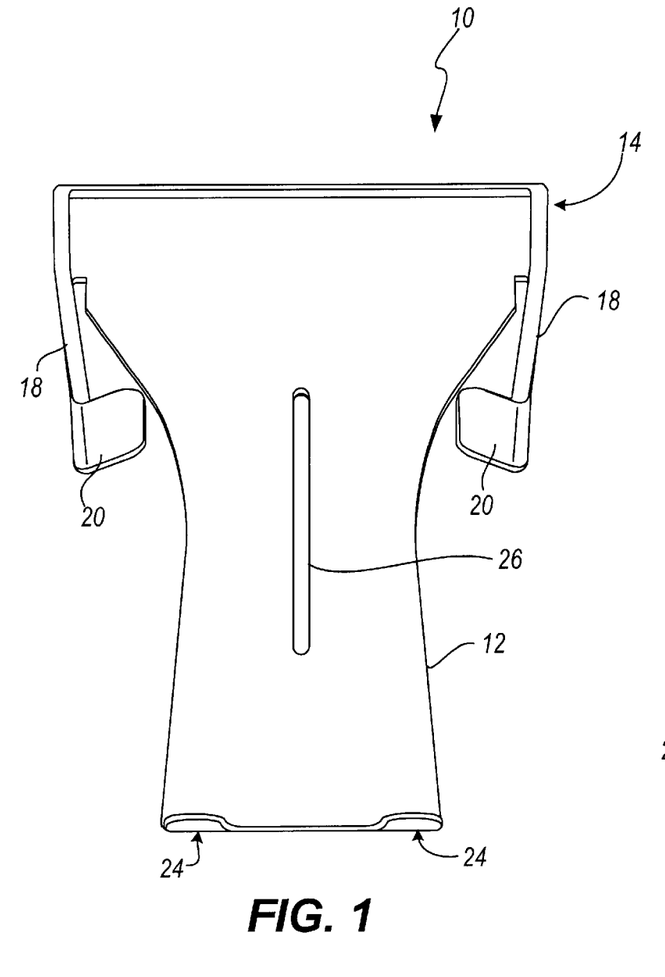
FIG. 1 is a front elevation view of one embodiment of the PDA attachment device of the present invention.
Figure 2:
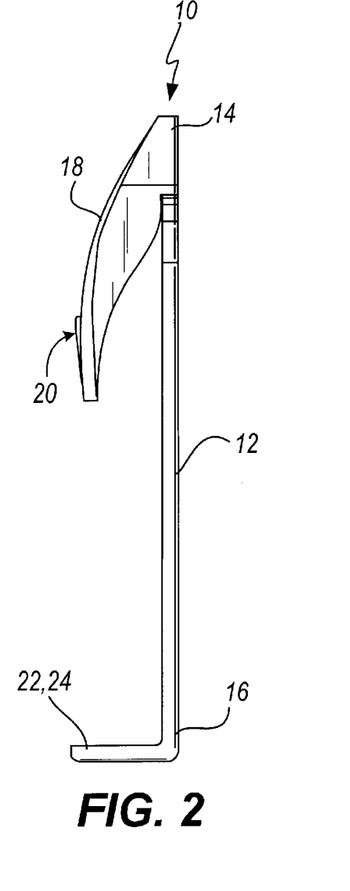
FIG. 2 is a right elevation view of the PDA attachment device shown in FIG. 1.
Figure 3:
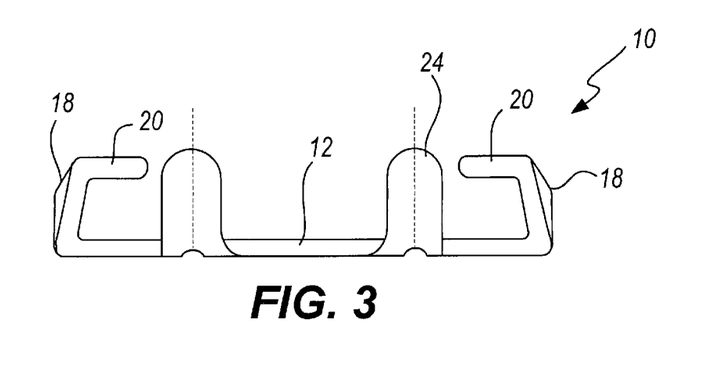
FIG. 3 is a bottom plan view of the PDA attachment device of FIG. 1.

With reference to FIGS. 1–3, the PDA attachment device 10 is shown in various views. The PDA attachment device 10 is generally comprised of a back surface 12 having a head end 14 and a base end 16. The PDA attachment device 10 includes a plurality of securement arms 18 extending from the head end 14 of the back surface 12. The securement arms 18 extend forward from the back 12, at or near the head end 14, and, in the embodiment shown, extend downward toward the base end 16. The securement arms 18 resiliently deflect to receive the PDA (not shown) and secure it with the resistance formed by the deflection. The arms 18 may extend substantially perpendicular to the back support 12, or may extend upward or downward to varying degrees. However, a larger downward dimension provides a greater range of deflection in the securement arms 18. Securement tabs 20 are provided at the ends of the securement arms 18 opposite the interconnection to the back surface 12. The securement tabs 20 provide an enlarged area that rest upon the front surface of the PDA to secure it within the attachment device 10. The location of the securement tabs 20 may also be adapted to allow the securement tabs 20 to be received into a portion of the PDA, e.g., a gap between the front and rear casings of the PDA.

The PDA attachment device also includes a base 22 to prevent the PDA from becoming disengaged from the attachment device 10 at the base end 16. The base 22 is a projection (or several projections) that extend substantially perpendicular from the base end 16 of the attachment device 10. As shown in the embodiment of FIGS. 1–3, the base 22 may comprise a plurality of base tabs 24. The base tabs 24 serve the same purpose as the base 22, however, the base tabs 24 are narrower to provide access to a communication or power port (not shown) on the PDA without removing the PDA from the attachment device 10.

With reference to FIG. 1, one embodiment of an attachment aperture 26 is shown. The attachment aperture 26, in the embodiment shown in FIG. 1, comprises a longitudinal slot provided along the back surface 12 of the attachment device 10. The attachment aperture 26 may facilitate the attachment device 10 to a surface with the use of connection means (not shown). The connection means may include an adhesive, rivets, screws, bolts, staples, a hook and loop closure, or any other similar attachment device commonly known in the art. The surface to which the attachment device 10 may be connected may include a folio or similar notebook as described more fully below. Alternatively, the attachment device 10 may be secured to a wall, a visor or dashboard of an automobile, or an interior surface of an attache case.

Figure 4:
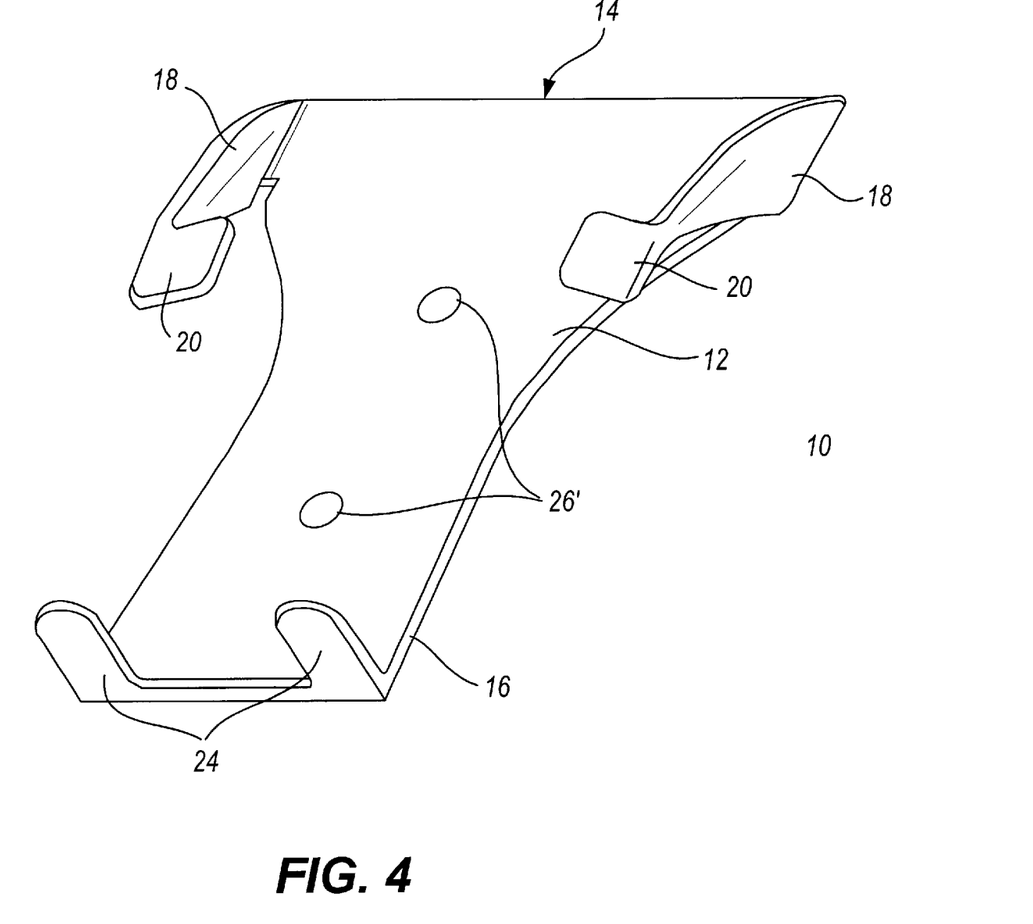
FIG. 4 is a right front view of an alternative embodiment of the PDA attachment device of the present invention.

With reference to FIG. 4, an alternative embodiment of the attachment device 10 of the present invention is shown in a front perspective view. The attachment device 10 generally comprises a back surface 12, securement arms 18 with securement tabs 20, and base tabs 24. However, in this embodiment, the attachment apertures 26' are cylindrical holes provided in the back surface 12 to allow interconnection to the folio 28 or other device. The cylindrical holes of the attachment apertures 26' may be more easily used with rivets, snaps, or screws, although any of the above attachment means may be used with this embodiment.

Figure 5:
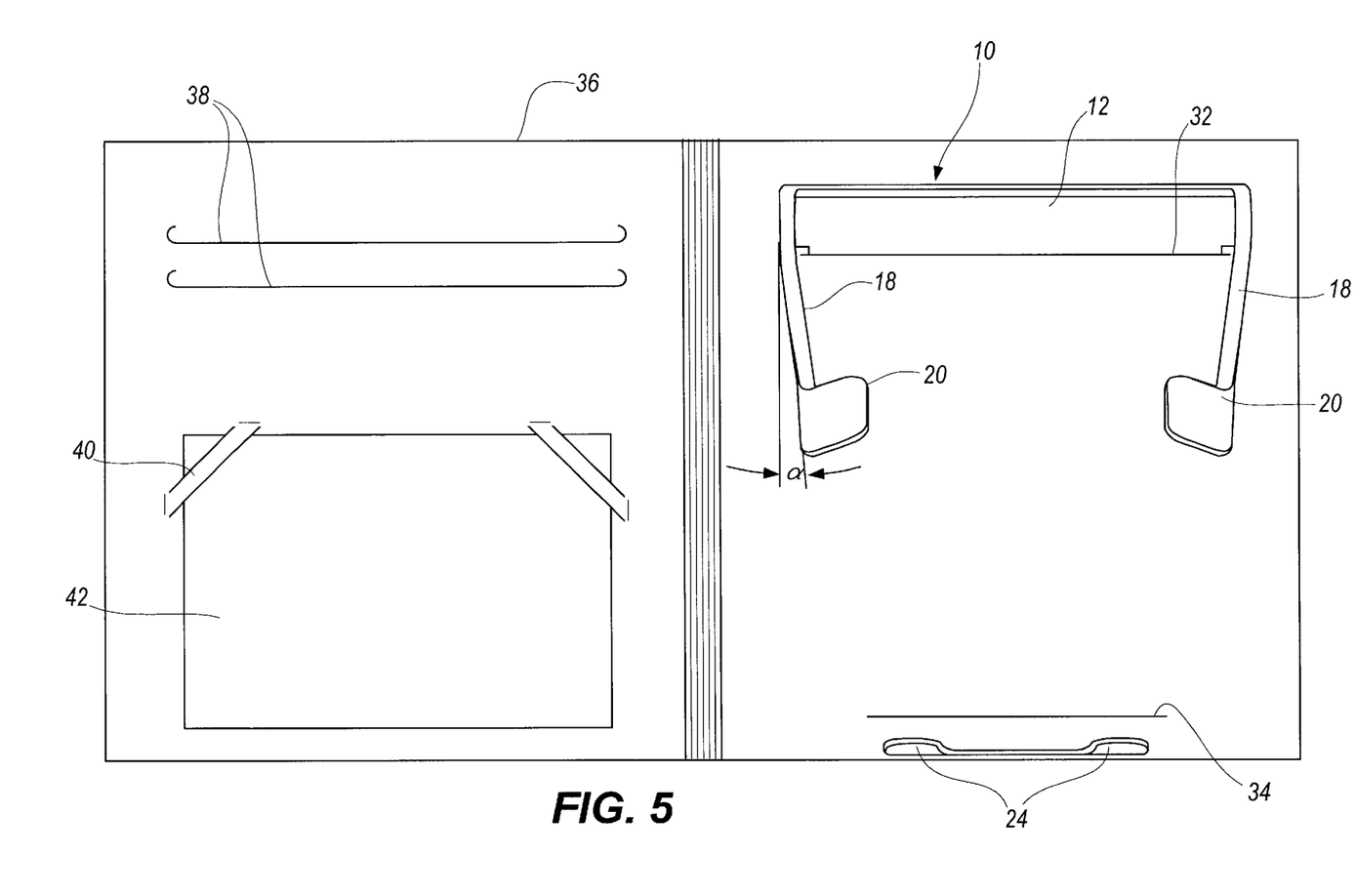
FIG. 5 is a front elevation view of another embodiment of the PDA attachment device of the present invention shown interconnected to an interior surface of a handheld notebook.

Referring now to FIG. 5, the attachment device 10 of the present invention is shown incorporated into a folio 28 or similar device. The attachment device 10 is generally interconnected to a surface of the folio 28. This interconnection may be accomplished by securing the attachment device 10 to the surface of the folio by a hook and loop closure, adhesive or, in an embodiment of the attachment device 10 with an attachment aperture 26, with other variations of the attachment means identified above. Alternatively, or in addition to the attachment means, the attachment device 10 may be secured within a layer 30, e.g. a fabric, of the folio surface. The attachment device 10 may be inserted, base end 16 first, into a first opening 32, until the base 22, or base tabs 24, extend through a second opening 34. Alternatively, the layer 30 may be secured to the surface of the folio 28, over the back surface 12 of the attachment device 10, after attachment device 10 is positioned on the surface of folio 28. The layer 30 may be secured by stitching, adhesive or other known assembly process.

The folio 28 of FIG. 5 may include other features to accommodate a typical user of a PDA. For example, the folio 28 of FIG. 5 shows a folio cover 36 which is hingedly interconnected to the folio 28. The folio cover 36 may then be closed on the PDA for protection during transportation of the folio 28 or storage in an attache. The folio cover 36 may include additional pockets 38 which maybe used, for example, to store business cards. Additionally, the folio cover may include a webbing 40 for interconnecting a paper tablet 42 or book of Post-It Notes®. The webbing 40 may be used in conjunction with a pocket 38 such that the backing of the tablet 42 may be first inserted into the pocket 38 and then the corners of the spine of the tablet 42 can be inserted into the webbing 40 to retain the tablet 42. In another embodiment not shown, a loop of material may be sewn, adhered, or otherwise interconnected to an edge of the folio 28, or at the hinge 44 of the folio to receive a pen or other writing instrument, or a stylus to be used with the PDA.

Figure 6:
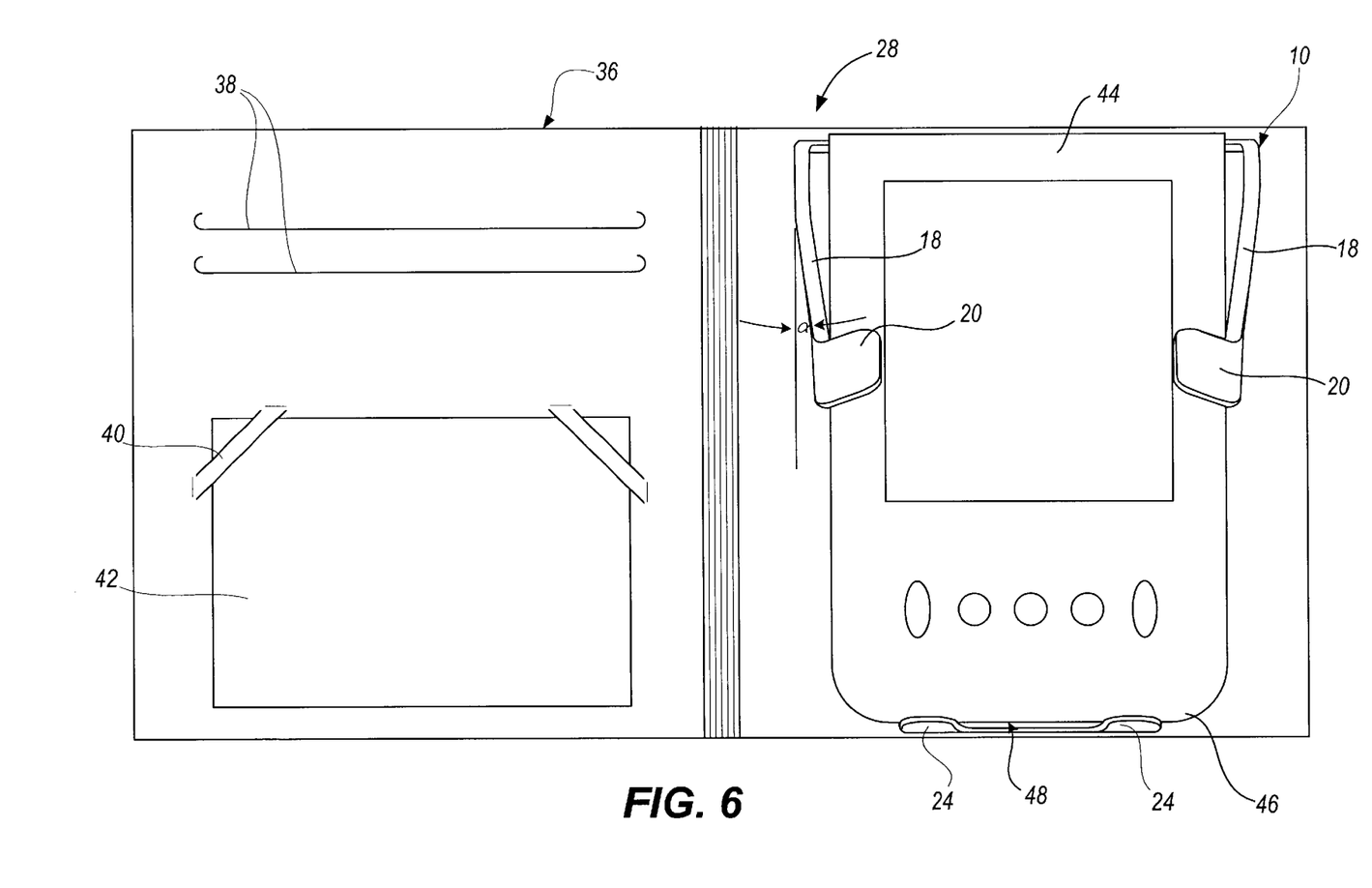
FIG. 6 is a front elevation view of the embodiment of Figs with a PDA shown positioned therein.
Figure 7:
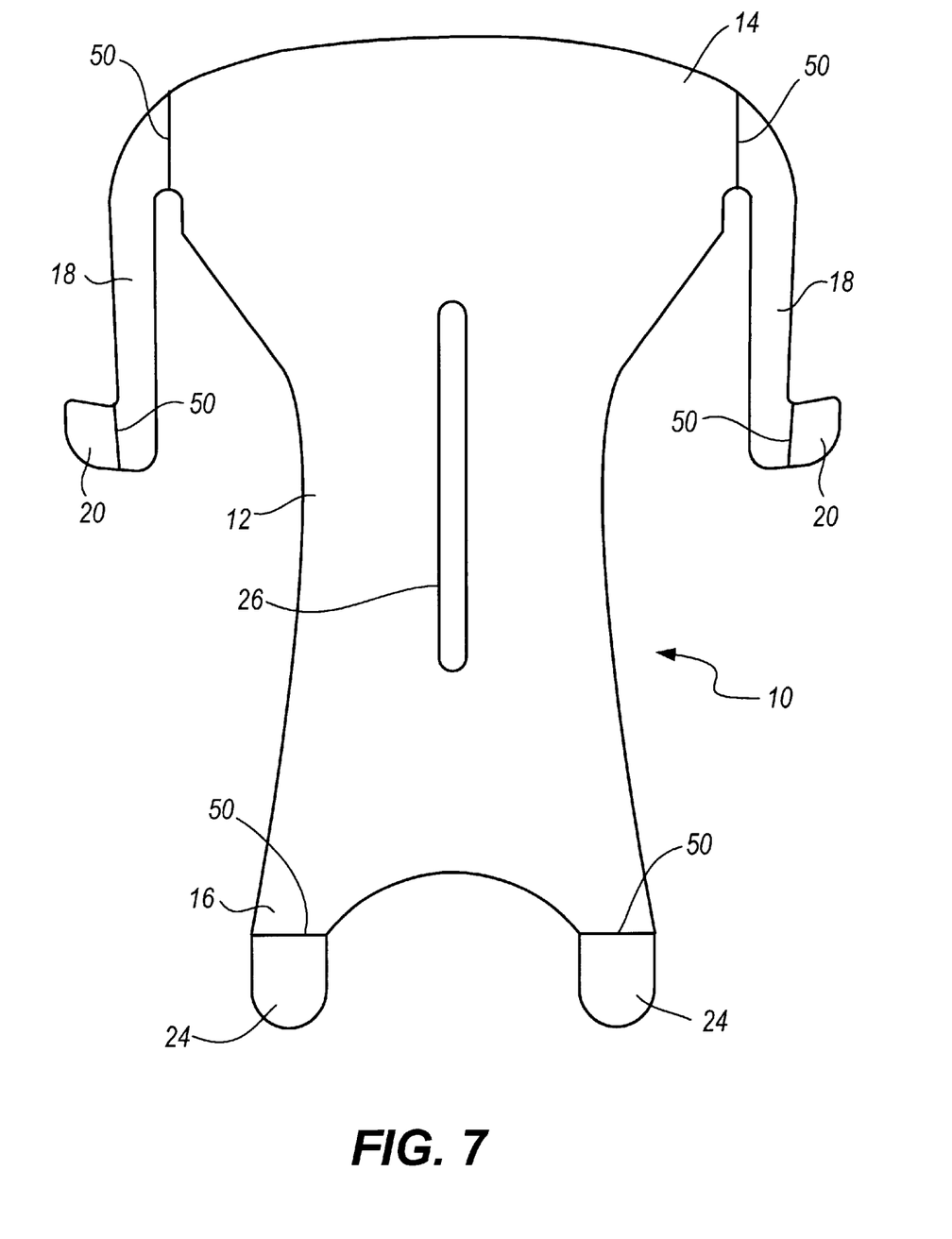
FIG. 7 is a front elevation view of an alternative embodiment of the PDA attachment device.
Figure 8:
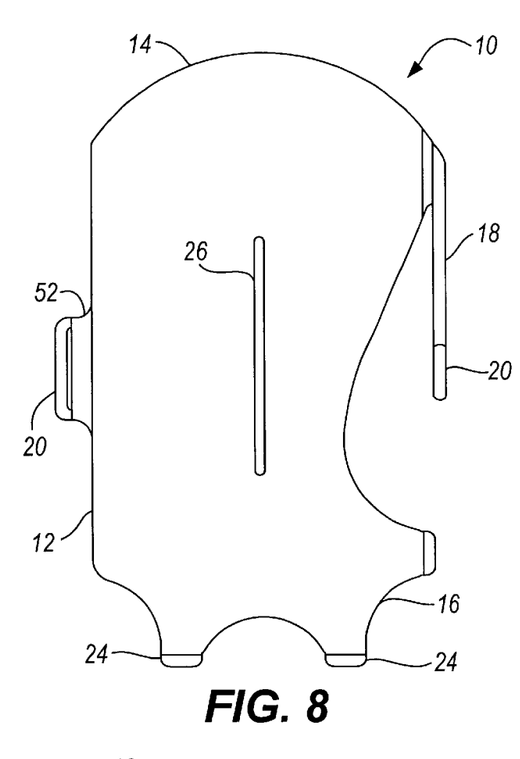
FIG. 8 is a front elevation view of an alternative embodiment of the present invention.
Figure 9:
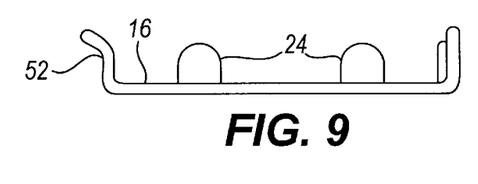
FIG. 9 is a bottom plan view of the embodiment shown in FIG. 8.
Figure 10:
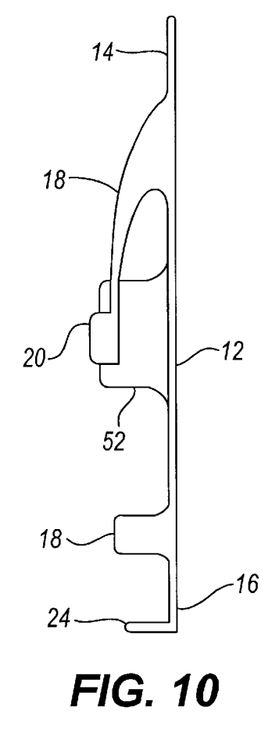
FIG. 10 is a right elevation view of the embodiment shown in FIG. 8.
Figure 11:
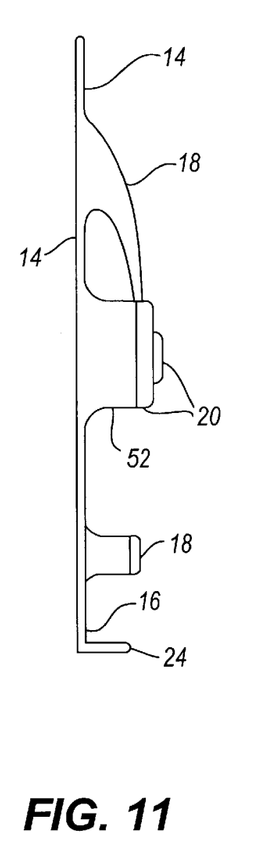
FIG. 11 is a left elevation view of the embodiment shown in FIG. 8.

Referring now to FIG. 6, the folio 28 of FIG. 5 is shown with a PDA 44 inserted into the attachment device 10. The PDA base 46 is inserted into the attachment device 10 at the head end of the device 10 until the PDA base 46 contacts the base tabs 24. The securement arms 18 deflect outwardly to receive the PDA 44. Once the PDA 44 is properly received into attachment device 10, the securement arms 18 constrain the PDA 44 by the force created in the securement arms 18 by the deflection. The inward angle of the securement arms 18 relative to the back surface 12 may be selected to provide the proper force necessary to retain the PDA 44, and may be designed specifically for various sizes and geometrical configurations of the PDA 44. Additionally, the material of construction of the attachment device 10 may be selected to improve the resiliency of the securement arms 18. The securement tabs 20 as shown rest upon the forward surface of the PDA 44 and prevent movement of the PDA in this direction. The base tabs 24 in the embodiment of FIG. 6 are set apart. If the position of the base tabs 24 are properly selected, a communication or battery port 48 may be accessed without removing the PDA 44 from the attachment device 10. FIG. 7 generally depicts the embodiment shown in FIG. 1, and further identifying the fold lines showing where the securement arms 18 are interconnected to the base 22 and the securement tabs 20 interconnected to the securement arms 18.

Referring now to FIGS. 8–11, an alternative embodiment of the present invention is provided herein, and identifying a front elevation view, bottom plan view, right elevation view and left elevation view, respectively. In this embodiment, a substantially rigid securement arm 52 is provided on the left side portion of the back surface 12, which is in opposing relationship to a resiliently deflectable securement arm 18 positioned on the right side of the back surface 12. At least one base tab 24 is interconnected to a base end 16 of the back surface 12, along with an additional deflectable securement arm 18 positioned on a lower right edge of the base 12. In alternative embodiments of the present invention the lower deflectable securement arm 18 may be removed altogether.

In use, a PDA 44 is removably interconnected to the PDA attachment mechanism by deflecting the securement arm 18 outwardly and positioning the PDA 44 between the rigid securement arm 52, lower base tabs 24 and deflectable securement arm 18 by applying outward pressure on the securement tab 20 positioned on the deflectable securement arm 18. Once the PDA 44 is in place, the deflectable securement arm 18 and associated tab 20 provide a biasing force inwardly against the PDA 44 for securement until removal, at which time the securement tab 20 is again pushed outwardly to release the PDA 44 from the PDA attachment device 10.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims. For example, it is foreseeable that the attachment mechanism of the present invention may be used with devices other than a PDA including, but not limited to, cellular telephones, global positioning systems (GPS), radios, and pagers.

To assist in the understanding of the invention and associated drawings, the following list of components and associated numbering are included herein:

Component
    10 PDA Attachment Device
    12 Back Surface
    14 Head End
    16 Base End
    18 Securement Arms
    20 Securement Tabs
    22 Base
    24 Base Tabs
    26 Attachment Apertures
    28 Folio
    30 Layer
    32 First Opening
    34 Second Opening
    36 Folio Cover
    38 Pockets
    40 Webbing
    42 Paper Tablet
    44 PDA
    46 PDA Base
    48 Communication or Battery Port
    50 Fold Lines
    52 Rigid Securement Arm

What is claimed is:

1. An attachment device adapted for removably securing a personal digital assistant, comprising:
    a back surface having a head end and a base end and at least two lateral edges positioned therebetween;
    a base interconnected to said base end of said back surface;
    a plurality of resiliently deflectable securement arms having a first end operably interconnected to said lateral edges back surface and a securement tab interconnected to a second end of said plurality of resiliently deflectable securement arms which are in an opposing relationship to said back surface, wherein said securement arms are deflectable in a plane which is substantially parallel to said back surface, and wherein the personal digital assistant may be retained and selectively removed from said attachment device in a space defined by said back surface, said base, said securement tabs, and said plurality of resiliently deflectable securement arms.

2. The attachment device of claim 1, further comprising at least one attachment aperture positioned in said back surface to provide selective interconnection to a storage device.

3. The attachment device of claim 2, wherein said storage device is at least one of a notebook, an attache, a clipboard, a piece of luggage and an article of clothing.

4. The attachment device of claim 2, wherein said attachment aperture comprises a slot extending along a longitudinal axis of said back surface, wherein said attachment device can be oriented in a plurality of different positions in said storage device.

5. The attachment device of claim 1, wherein said attachment device comprises at least one of a plastic material, a metallic material, a rubber material and a combination therein.

6. The attachment device of claim 1, wherein said resiliently deflectable securement arms are biased to provide a force against the personal digital assistant, when it is positioned within said attachment device.

7. The attachment device of claim 1, wherein said back surface, said base, said plurality of resiliently deflectable securement arms and said securement tabs are comprised of an integral injection molded material.

8. The attachment device of claim 1, wherein the personal digital assistant includes at least one of a handheld personal computing device, a cellular telephone, a global positioning system, a radio, and a pager.

9. A storage device adapted for storing a personal digital assistant, comprising:

a first surface;

a cover hingedly interconnected to said first surface; and an attachment device interconnected to said first surface, said attachment device comprising:
  a) a back surface having an upper end and a lower end, and at least two lateral edges positioned therebetween;
  b) at least one securement arm interconnected to said back surface, said securement arm being resiliently deflectable and having a securement tab positioned opposite said back surface wherein a personal digital assistant may be inserted and retained by said attachment device in a space defined by said securement tab, said at least one securement arm and said back surface.

10. The storage device of claim 9, wherein said back surface is removably interconnected to said first surface.

11. The storage device of claim 9, wherein said attachment device comprises an integral piece of at least one of a plastic, a rubber, a metal and a combination thereof.

12. The storage device of claim 9, wherein said storage device comprises at least one of a notebook, a wallet, an attache, a purse, a clipboard, and a piece of luggage.

13. The storage device of claim 9, further comprising an aperture positioned in said back surface which is adapted for removable interconnection of said first surface and said attachment device.

14. The storage device of claim 9, wherein said securement tabs are deflectable with respect to said at least one securement arm.

15. The storage device of claim 9, wherein said attachment device further comprises a substantially rigid securement arm interconnected to said back surface which is in opposing relationship to said resiliently deflectable securement arm to further retain said personal digital assistant in said attachment device.

16. The storage device of claim 9, further comprising at least one base portion interconnected to said lower end of said back surface, wherein the personal digital assistant is retained by a space defined by said back surface, said at least one securement arms, said securement tab and said at least one base portion.

17. A storage device adapted for removably securing a personal digital assistant, comprising:

a back surface having an upper end and a lower end;

at least one deflectable securement arm having a first end and a second end, said first end interconnected to said upper end of said back surface and said second end extended toward said lower end of said back surface, said second end interconnected to a securement tab oriented in opposing relationship to said back surface, wherein the personal digital assistant may be inserted and retained in said storage device by at least said back surface, said securement tab and said at least one deflectable securement arm.

18. The storage device of claim 17, wherein said at least one deflectable securement arm is comprised of at least one of a plastic material, a rubber material, a metallic material and combinations therein.

19. The storage device of claim 17, further comprising attachment means to secure said storage device to at least one of a notebook, a wallet, an attache, a clipboard, a purse, a piece of luggage, and an article of clothing.

20. The storage device of claim 19, wherein said attachment means comprises an aperture positioned in said back surface which is adapted for receiving a piece of attachment hardware.

21. The storage device of claim 19, wherein said attachment means comprises at least one of a hook and loop material interconnected to said back surface for operable engagement to an opposing hook and loop material.

22. The storage device of claim 17, further comprising a substantially rigid securement arm interconnected to said back surface which is in opposing relationship to said at least one deflectable securement arm to further retain said personal digital assistant in said storage device.

23. The storage device of claim 17, further comprising at least one base member interconnected to said lower end of said back surface.

24. The storage device of claim 17, wherein the personal digital assistant includes at least one of a handheld personal computing device, a cellular telephone, a global positioning system, a radio, and a pager.

* * * * *